Figure 1:
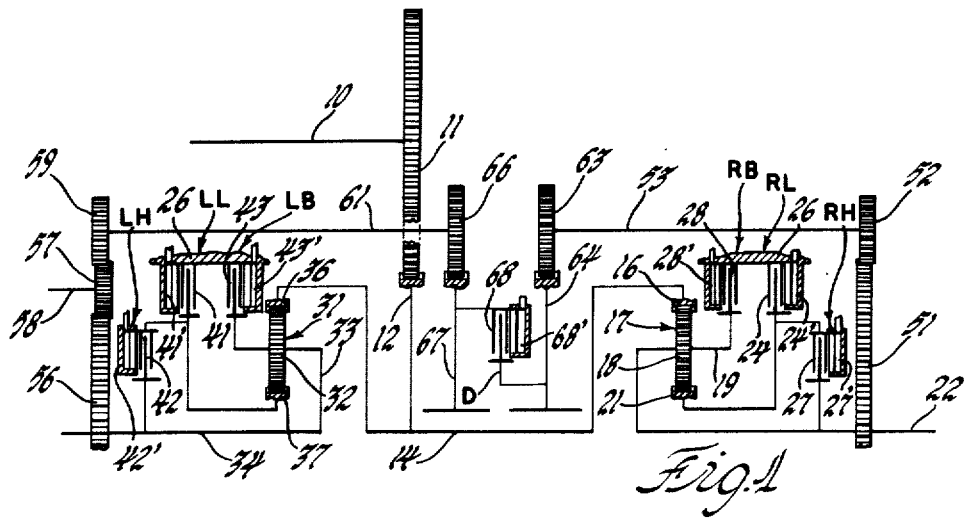

Oct. 22, 1963    J. C. POLAK ET AL    3,107,554

TRANSMISSION

Filed Feb. 24, 1961

INVENTORS
James C. Polak &
BY William G. Livezey

A. M. Heiter
ATTORNEY

États-Unis Patent Office 3,107,554
Patented Oct. 22, 1963

3,107,554
TRANSMISSION
James C. Polak and William G. Livezey, Indianapolis,
Ind., assignors to General Motors Corporation, Detroit,
Mich., a corporation of Delaware
Filed Feb. 24, 1961, Ser. No. 91,411
22 Claims. (Cl. 74—720.5)

This invention relates to transmissions and particularly to cross-dirve transmissions having a plurality of steering systems.

The cross-drive transmission employs a right and a left drive unit each having a low and high speed ratio drive and an output brake. These drive units may be operated to provide clutch brake steering by controlling one unit to disengage both ratio drives and to engage the brake. With the brake fully engaged and stopping one track, the steer ratio, the speed of the outer track over the speed of the inner track, will be a finite positive speed over zero or infinity. Clutch brake steering provides an excellent infinite steer ratio and for short periods may provide by slipping the output brake any positive value steer ratio. However, for long periods of steering as required to move a tracked vehicle through a constantly curved path the constantly slipping output brake may overheat and wear excessively. For this reason it is desirable to also provide geared steering by controlling the drive units to provide high speed ratio in one and low speed ratio in the other to obtain constant radius turning and eliminate slipping clutches or brakes.

Sometimes it is necessary to pivot a tracked land vehicle. This is accomplished by driving one track forward and the other in reverse at the same speed or at a steering ratio of minus one. To obtain pivot steering the right and left output shafts are connected through a differential drive and both of the drive units are controlled to provide the same drive, either high or low.

These three steering systems may be combined in a cross-drive transmission having two spaced drive units providing low and high speed ratio and a vehicle brake. The differential drive from each output shaft may be connected by a clutch and gearing to reduce the clutch slip speed located between the drive units to provide a transmission having a small housing envelope.

A direct clutch connection between the differential shafts connected to the output shafts simplifies the gearing. The clutch connecting the differential drive may also be located in the hub of an output shaft gear of the differential drive to provide a simplified gear train, a small transmission housing envelope and a low slip speed clutch.

An object of the invention is to provide a cross-drive transmission having clutch brake steering, geared steering, and pivot steering.

Another object of the invention is to provide in a cross-drive transmission having a pair of low and high speed ratio and vehicle brake units controllable to provide clutch brake and geared steering and also having a differential drive selectively connecting the units differentially to provide pivot steering.

Another object of the invention is to provide in a cross-drive transmission having a cross shaft, a low and a high speed ratio and vehicle brake unit at each end of the cross shaft drivingly connecting the cross shaft to an output shaft, a differential drive connecting said output shafts, having a clutch selectively connecting one output shaft to a gear mounted concentrically with that output shaft.

Another object of the invention is to provide in a cross-drive transmission having a cross shaft connected at each end by a low and high speed ratio drive unit to an output shaft and a vehicle brake for retarding the output shaft, a differential drive including a differential shaft driven by each output shaft and a clutch located between said drive units to selectively connect said differential shafts.

Another object of the invention is to provide in a cross-drive transmission having a cross shaft connected at each end by a low and a high speed ratio drive unit to an output shaft and having a vehicle brake for retarding the output shaft, a differential drive including a differential shaft driven by each output shaft and a clutch located between said units and connected to said differential shafts by reduction gearing to reduce the clutch slip speed and provide a smaller transmission housing envelope.

FIGURE 1 diagrammatically shows one transmission gearing arrangement.

Figure 2:
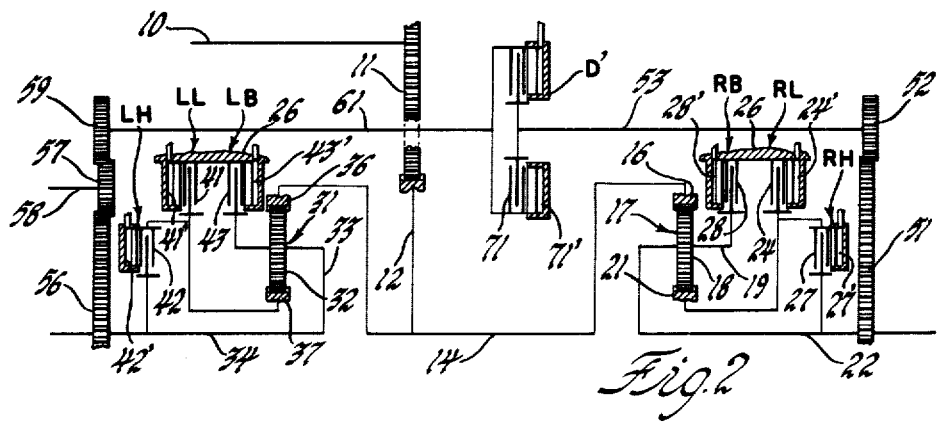

FIGURE 2 diagrammatically shows another transmission gearing arrangement.

Figure 3:
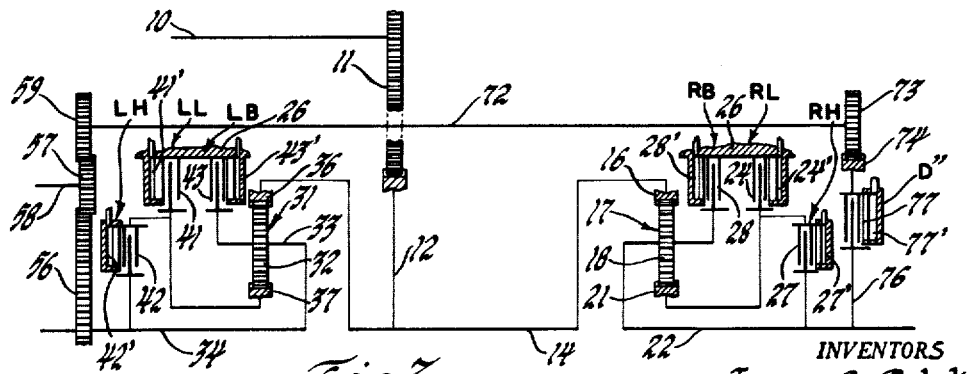

FIGURE 3 diagrammatically shows another transmission gearing arrangement.

The invention is illustrated in a cross-drive transmission arrangement having an input shaft 10 driving a spur gear 11 fixed to the input shaft. Spur gear 11 meshes with and drives spur gear 12 fixed on the cross shaft 14 which is located centrally and transversely of the vehicle. Cross shaft 14 drives a ring gear 16 of the right planetary gearset 17. The planetary pinions 18 rotatably mounted on a carrier 19 mesh with the ring gear 16 and a sun gear 21. The carrier 19 is connected to drive the right output shaft 22. The sun gear 21 is selectively connected by a friction engaging device, such as the right low brake RL, to the transmission housing 26 when the plates 24 are engaged by motor 24', to hold the sun gear 21 against rotation to provide low speed ratio drive. Sun gear 21 may also be connected or locked to rotate with the output shaft 22 by the right friction engaging device or right high clutch RH, when plates 27 are engaged by motor 27' to lock the planetary gear unit 17 to provide high speed ratio for direct drive. The output shaft is connected by carrier 19 to the right vehicle brake RB which retards the vehicle when plates 28 are engaged by motor 28'.

Cross shaft 14 is connected to the left planetary gear unit 31 which has planetary pinions 32 rotatably mounted on a carrier 33, drivingly connected to the left output shaft 34. A ring gear 36 driven by the cross shaft 14, meshes with pinions 32. A sun gear 37 meshes with pinions 32 and is connected by a friction engaging device, such as left low brake LL, when plates 41 are engaged by motor 41', to the transmission housing 26 to retard the sun gear for low speed ratio drive, or is connected by a friction engaging device or left high clutch LH, when plates 42 are engaged by motor 42', to lock the sun gear 37 and output shaft 34 together for rotation to provide high speed ratio or direct drive. The output shaft 34 may also be retarded by the left vehicle brake LB, when plates 43 are engaged by motor 43'. The left brake LB is connected through the carrier 33 to the output shaft 34.

There is also a differential drive connection between the right output shaft 22 and left output shaft 34. The right output shaft drives a spur gear 51 and pinion 52 which drives the right differential shaft 53. The left output shaft 34 drives a spur gear 56, a reversing pinion 57 rotatably mounted on the transmission housing by shaft 58, the pinion 59 and left differential shaft 61. The right differential shaft 53 drives through pinion 63 a large spur gear 64 mounted for rotation concentrically about cross shaft 14. The left differential shaft 61 similarly drives a pinion 66 and a large spur gear 67 mounted concentrically with shaft 14. The slowly rotating spur gears 64 and 67 are located between the planetary unit 17 and 31 and rotate slowly compared to the output shafts. A clutch D having plates 68 engaged by motor 68' provides a drive connection between the spur gears 64—67.

This transmission may be operated by engaging the clutches and brakes, as shown in the following table, to provide straight and forward drive with both low reaction brakes LL, RL engaged or high forward drive with both high clutches LH and RH engaged. Clutch brake steering or drive brake steering may be provided in either low or high ratio by leaving either ratio engaged in the left unit and disconnecting the drive in the right gear unit and engaging the right brake for a right turn. The term clutch brake steering or drive brake steering is used to define a steering arrangement where the drive to one side of the vehicle is disconnected and this one side is braked. Right geared steering is provided by engaging left high drive and right low drive. Pivot steering may also be obtained in either low or high ratio by leaving one of these ratios engaged in the left unit, disengaging both drives in the right unit and engaging the differential clutch D to drive the right hand unit in a reverse direction. Left steering is obtained in a similar manner.

|  | LH | LL | LB | D | RB | RL | RH |
|---|---|---|---|---|---|---|---|
| 1. Forward Low |  | X |  |  |  | X |  |
| 2. Forward High | X |  |  |  |  |  | X |
| 3. Clutch Brake Steer: |  |  |  |  |  |  |  |
| Right Low |  | X |  |  | X |  |  |
| Right High | X |  |  |  | X |  |  |
| 4. Right Geared Steer | X |  |  |  |  | X |  |
| 5. Pivot Steer: |  |  |  |  |  |  |  |
| Right Low |  | X |  | X |  |  |  |
| Right High | X |  |  | X |  |  |  |

In this gearing arrangement the differential clutch D is located between the planetary gearsets 17 and 31 to provide a small size transmission housing or envelope around the gear assembly. The pinion gear 63 is small as compared to the spur gear 64 and similarly to reduce the clutch speed substantially to output shaft speed to provide a slow slip speed for more efficient and cooler operation of the friction plates 68 of the differential clutch D.

In the modifications shown in FIGURE 2, the same input drive cross shaft 14 and output planetary gearsets 17 and 31 are employed but the differential drive is modified. The right output shaft 22 drives, through the gearset 51—52, the right differential shaft 53. The left output shaft 34 drives, through the reversing spur gearset 56—57—59, the right differential shaft 61. The right and left differential shafts 53 and 61 are connected by plates 71 when engaged by motor 71' of differential clutch D'. This directly connected clutch eliminates four gear units, thus providing a simplified gearing arrangement.

The modification illustrated in FIGURE 3 has a similar input drive to cross shaft 14 and planetary gearsets 17 and 31 driving respectively the right output 22 and the left output shaft 34. The differential gear connection from the left output 34 is by means of the spur gearset 56—57—59 to a cross differental shaft 72, extending completely across the transmission and driving a pinion 73 meshing with a large spur gear 74. The large spur gear 74 has included in its hub structure 76 a differential clutch D" having plates 77 connecting when engaged by motor 77' the spur gear 74 to the hub 76 which is fixed to the output shaft 22. This modification provides a small transmission housing or small gear assembly envelope and a differential clutch D" operating at a low slip speed with a minimum number of gears.

The control sequence for providing forward drive, clutch brake steer, geared steer and pivot steer is the same in each of these modifications. These arrangements provide in a cross-drive transmission a steering control arrangement of great adaptability providing three types of steering systems, clutch brake steer, gear steer and differential pivot steer, so that the operator of a vehicle employing this arrangement may have full control of the vehicle at all times and may selectively employ the control most desirable from a standpoint of both vehicle maneuverability and efficiency of operation.

The above modifications are illustrative of the invention which may be modified by those skilled in the art within the scope of the appended claims.

We claim:

1. In a cross-drive transmission, a cross shaft, a pair of output shafts, a variable speed ratio drive gear unit operatively connecting each end of said cross shaft to each of said output shafts providing a low speed ratio drive and a high speed ratio drive, a brake operably connected to each of said output shafts to retard said output shafts, drive means selectively connecting said output shafts including a direction reversing gear train and a selectively operable clutch.

2. The invention defined in claim 1 and said clutch being concentrically located about one of said shafts.

3. The invention defined in claim 1 and said clutch being located between said variable speed ratio drive gear units.

4. The invention defined in claim 1 and said clutch being concentrically located about said cross shaft.

5. The invention defined in claim 1 and said clutch being located concentrically about one of said output shafts.

6. In a cross-drive transmission, a cross shaft, a pair of output shafts, a pair of reduction gear trains, a variable speed ratio drive gear unit operatively connecting each end of said cross shaft to each of said output shafts providing a low speed ratio drive and a high speed ratio drive, a brake operably connected to each of said output shafts to retard said output shafts, direction reversing gear means operatively connecting one of said output shafts to one of said reduction gear trains, the other of said reduction gear trains operatively connected to the other of said output shafts and a selectively operable clutch connecting said reduction gear trains.

7. In a cross-drive transmission, a cross shaft, a pair of output shafts, a variable speed ratio drive gear unit operatively connecting each end of said cross shaft to each of said output shafts providing a low speed ratio drive and a high speed ratio drive, a brake operably connected to each of said output shafts to retard said output shafts, drive means selectively connecting said output shafts including a direction reversing gear train and a selectively operable clutch located concentrically about said cross shaft and between said variable speed ratio drive gear units.

8. In a cross-drive transmission, a cross shaft, a pair of output shafts, a variable speed ratio drive gear unit operatively connecting each end of said cross shaft to each of said output shafts providing a low speed ratio drive and a high speed ratio drive, a brake operably connected to each of said output shafts to retard said output shafts, drive means selectively connecting said output shafts including one gear fixed to one output shaft, another gear rotatably mounted on the other output shaft, a selectively operable clutch connecting said another gear and said another output shaft and a direction reversing gear train connecting said one and another gears.

9. In a cross-drive transmission, a cross shaft, a right and a left output shaft, a right and a left variable speed ratio drive gear unit operatively connecting respectively the right and left end of said cross shaft to each said right and left output shaft, each of said variable speed ratio drive gear units providing a low speed ratio drive and a high speed ratio drive, a right and a left brake operably connected respectively to said right and left output shaft to retard said right and left output shaft, drive means selectively connecting said output shafts including a direction reversing gear train and a selectively operable clutch.

10. In a cross-drive transmission, a cross shaft, a right and a left output shaft, a right and a left variable speed ratio drive gear unit operatively connecting respectively the right and left end of said cross shaft to each said right and left output shaft, each of said variable speed ratio drive gear units providing a low speed ratio drive and a high speed ratio drive, a right and a left brake operably connected respectively to said right and left output shaft to retard said right and left output shaft, drive means selectively connecting said output shafts including a direction reversing gear train and a selectively operable clutch located concentrically about one of said shafts.

11. The invention defined in claim 10 and said clutch being located concentrically about said cross shaft.

12. The invention defined in claim 10 and said clutch being located concentrically about one of said output shafts.

13. In a cross-drive transmission, a cross shaft, a right and a left output shaft, a right and a left variable speed ratio drive gear unit operatively connecting respectively the right and left end of said cross shaft to each said right and left output shaft, each of said variable speed ratio drive gear units providing a low speed ratio drive and a high speed ratio drive, a right and a left brake operably connected respectively to said right and left output shaft to retard said right and left output shaft, drive means selectively connecting said output shafts including a direction reversing gear train, a selectively operable clutch located concentrically about said cross shaft between said variable speed ratio drive gear units and reduction gear means connecting each output shaft to said clutch to reduce the speed of the relatively movable parts of said clutch.

14. In a cross-drive transmission, a cross shaft, a right and a left output shaft, a right and a left variable speed ratio drive gear unit operatively connecting respectively the right and left end of said cross shaft to each said right and left output shaft, each of said variable speed ratio drive gear units providing a low speed ratio drive and a high speed ratio drive, a right and a left brake operably connected respectively to said right and left output shaft to retard said right and left output shaft, drive means selectively connecting said output shafts including a direction reversing gear train, a gear fixed to each output shaft, reduction gear means driven at a slower speed by each gear and a selectively operable clutch operable to connect said reduction gear means.

15. The invention defined in claim 14 and said reduction gear means including a pinion and shaft.

16. In a cross-drive transmission, a cross shaft, a right and a left output shaft, a right and a left variable speed ratio drive gear unit operatively respectively the right and left end of said cross shaft to each said right and left output shaft, each of said variable speed ratio drive gear units providing a low speed ratio drive and a high speed ratio drive, a right and a left brake operably connected respectively to said right and left output shaft to retard said right and left output shaft, a gear rotatably mounted on one output shaft, a direction reversing gear train connecting the other output shaft to said gear, and a clutch selectively connecting said gear to said one output shaft.

17. In a cross-drive transmission, cross shaft means, a pair of output shafts, a variable speed ratio drive gear unit operatively disconnecting and connecting said cross shaft means to each of said output shafts selectively providing neutral, a low speed ratio drive and a high speed ratio drive to provide a two speed drive and geared steering, a brake operatively connected to each of said output shafts to retard said output shafts to provide braking and in conjunction with neutral and two speed drive in said gear units to provide drive brake steering, and drive means including a selectively operable clutch selectively connecting said output shafts so that when one of said output shafts is rotated in one direction said one output shaft drives the other of said output shafts in the opposite direction to provide pivot steering.

18. The invention defined in claim 17 and said clutch being concentrically located about one of said shafts.

19. The invention defined in claim 17 and said clutch being located between said variable speed ratio drive gear units.

20. The invention defined in claim 17 and said clutch being concentrically located about said cross shaft means.

21. The invention defined in claim 17 and said clutch being located concentrically about one of said output shafts.

22. In a cross-drive transmission, cross shaft means, a right and a left output shaft, a right and a left variable speed ratio drive gear unit operatively connecting respectively said cross shaft means to each said right and left output shaft, each said right and left variable speed ratio drive gear unit having respectively a right and a left ring gear, a right and a left carrier member, a right and a left sun gear, and a right and a left planetary pinion means rotatably mounted respectively on each said right and left carrier member, said right planetary pinion means in mesh with said right ring gear and said right sun gear, said left planetary pinion means in mesh with said left ring gear and said left sun gear, each said right and left ring gear drivingly connected to said cross shaft means, said right and left carrier member drivingly connected respectively to each said right and left output shaft, a right and a left first brake operably connected respectively to each said right and left sun gear to retard each said right and left sun gear to provide a low forward speed ratio drive, a right and a left clutch operably connecting respectively said right and left sun gear to each said right and left output shaft to rotate respectively each said right and left sun gear with each said right and left output shaft to provide a high forward speed ratio drive, a right and a left second brake operably connected respectively to each said right and left output shaft to retard each said right and left output shaft, said right and left variable speed ratio gear unit providing low speed ratio drive clutch brake steering when the second brake in one of said gear units is operated to retard the output shaft driven by said one gear unit and the first brake in the other of said gear units is operated to retard the sun gear in said other gear unit, high speed ratio drive clutch brake steering when the second brake in one of said gear units is operated to retard the output shaft driven by said one gear unit and the first clutch in the other of said gear units is operated to connect the sun gear of said other gear unit to the output shaft driven by said other gear unit, and geared steering when the first clutch in one of the gear units is operated to connect the sun gear in said one gear unit to the output shaft driven by said one gear unit and the first brake in the other of said gear units is operated to retard the sun gear in said other gear unit, and drive means including selectively operable clutch means selectively connecting said right output shaft to said left output shaft so that when one of the output shafts is rotated in one direction said one output shaft drives the other of said output shafts in the opposite direction to provide pivot steering, said right and left variable speed ratio gear unit providing low speed ratio drive pivot steering when said clutch means is operated to connect said right output shaft to said left output shaft and the first brake in one of the gear units is operated to retard the sun gear in said one gear unit, and high speed ratio drive pivot steering when said clutch means is operated to connect said right output shaft to said left output shaft and the clutch in one of the gear units is operated to connect the sun gear of said one gear unit to the output shaft driven by said one gear unit.

References Cited in the file of this patent

UNITED STATES PATENTS 2,655,054  Kelley ---------------- Oct. 13, 1933

UNITED STATES PATENT OFFICE
CERTIFICATE OF CORRECTION

Patent No. 3,107,554                      October 22, 1963

James C. Polak et al.

It is hereby certified that error appears in the above numbered patent requiring correction and that the said Letters Patent should read as corrected below.

Column 1, line 10, for "cross-dirve" read -- cross-drive --; column 5, line 45, after "operatively" insert -- connecting --; column 6, line 72, for "Oct. 13, 1933" read -- Oct. 13, 1953 --.

Signed and sealed this 21st day of April 1964.

(SEAL)
Attest:
ERNEST W. SWIDER

Attesting Officer

EDWARD J. BRENNER

Commissioner of Patents